United States Patent Office 3,480,615
Patented Nov. 25, 1969

3,480,615
PRETREATMENT OF CELLULOSE WITH A SULFO-LOWER FATTY ACID UNDER ANHYDROUS CONDITIONS
Gordon D. Hiatt and John W. Mench, Rochester, N.Y., assignors to Eastman Kodak Company, Rochester, N.Y., a corporation of New Jersey
No Drawing. Filed Sept. 20, 1967, Ser. No. 669,262
Int. Cl. C08b 1/02
U.S. Cl. 260—229                                  6 Claims

ABSTRACT OF THE DISCLOSURE

The pretreatment of cellulose with a sulfo-lower fatty acid such as sulfoacetic acid under anhydrous conditions results in a product having a significantly enhanced reactivity toward dicarboxylic acid anhydrides.

---

This invention relates to the pretreatment of cellulose and cellulosic materials with sulfoacetic acid in acetic acid and acetic anhydride under anhydrous conditions.

In the preparation of cellulose esters it is desirable that the cellulose be readily susceptible to reaction thereon by the acid anhydride use as the esterification agent. It is known that dibasic acid esters of cellulose can be prepared by the reaction of cellulose of a low degree of polymerization (D.P.) with dibasic acid anhydrides in the presence of pyridine, using the latter as a reaction solvent and a catalyst. It is similarly known that low D.P. cellulose can be reacted with dibasic acid anhydrides in the presence of acetic acid as reaction solvent, using either pyridine or the acetate of an alkali metal as the basic catalyst.

While it is known that sulfoacetic acid in the presence of acetic acid may be used as a medium in which the degree of polymerization, and hence the viscosity of cellulose may be reduced, the cellulose so treated has the disadvantage of being non-uniform in its degradation and activation. (Such reduction of viscosity of the cellulose prior to the esterification thereof is known in the art as a "pretreatment" step.) In addition, cellulose dibasic acid esters, produced by the reaction of cellulose pretreated in this manner with dibasic acid anhydrides, show undesirable haziness or opalescence in solution, and have limited solubility characteristics. As conventional separation techniques do not remove the small amount of unreacted cellulose which causes the haziness in solution, this defect is carried over into other solutions, as when cellulose dibasic acid esters so prepared and separated from their reaction media are added to dope formulations. Hitherto the present invention, long reaction times were required to guarantee dibasic acid esters of cellulose sufficiently uniform to produce clear solutions in solvent systems.

It is an object of our invention to provide an improved method of reducing the viscosity of cellulose, prior to its esterification with dibasic acid anhydrides, in such a manner that the cellulose so treated possesses both the desired viscosity and a greater reactivity (during the subsequent esterification reaction with dicarboxylic acid anhydride).

Another object of our invention is to make it possible to shorten the time necessary to react pretreated cellulose with dibasic acid anhydrides to produce dibasic acid esters of cellullose of improved clarity and solubility in useful solvent systems.

We have found that these objects, as well as others that will become evident from the following discussion, can be attained by pretreating a cellulose slurry with sulfoacetic acid (or other sulfo lower fatty acid) in acetic acid (or other lower fatty acid), in the presence of sufficient acetic anhydride (or other lower fatty anhydride) to render the mixture anhydrous.

The pretreatment step may be carried out at an elevated temperature of from about 50° C. to about 200° C., for such time as is necessary to reduce the intrinsic viscosity of the cellulose (as determined, for example, in a conventional copper-ethylene diamine solution) until it is within the range of from about 0.5 to about 3. In the process employing acetic acid as the major bath component, we prefer to maintain the temperature at a range of from about 80° C. to about 150° C.

The upper limit of the temperature range of the pretreatment step is determined and limited by the boiling point of the lower fatty acid used in the pretreatment bath. For example, in the preferred pretreatment bath employing acetic acid as the lower fatty acid, the upper temperature limit is set at around 120° C., near the boiling point of glacial acetic acid (118.4° C.).

During the pretreatment, nearly all of the cellulose is dispersed rather than dissolved in the pretreatment bath. In our process, no more than 5 weight percent of cellulose is dissolved in the pretreatment bath, with 2 percent being near the average dissolved therein.

The pretreated cellulose yielded from a pretreatment bath of the type disclosed herein is preferably in particulate form. In our process, about 85% of the pretreated cellulose is of a particle size of less than 1.4 mm. in diameter.

It is believed that under anhydrous conditions the sulfo lower fatty acid attacks and breaks the cellulose chains, thereby lowering the intrinsic viscosity. The maintenance of anhydrous conditions is therefore considered essential to the herein described viscosity reducing step. In addiiton, the surprising result of greatly increased reactivity of the cellulose is obtained if the cellulose is treated in the manner according to our invention, that is, if anhydrous conditions are maintained. This increased reactivity leads to lessened reaction time in the esterification reaction to follow. We have found that it is the presence of water during the viscosity reduction step (in accordance with conventional pretreatment procedures involving the use of sulfo lower fatty acid) that leads to the shortcomings described above.

If the pretreatment of cellulose is accomplished in the manner herein described (a) the cellulose viscosity reduction is more extensive and uniform and as a result, more dependable than that obtained with the agents usually used for this purpose (b) the sulfo lower fatty acid does not combine with the cellulose, and (c) the treated material is easier to handle. We have found that the products obtained in the subsequent esterification by dibasic acid anhydrides have improved solubility and uniformity in solutions thereof, characterized by increased clarity as compared with solutions of products obtained by esterifying cellulose that has been "pretreated" via conventional processes.

After the pretreatment, it may be desirable to remove the sulfo lower fatty acid with a lower fatty acid. As the catalyst used in the subsequent esterification is basic when in acetic acid solution, as for example, sodium acetate or pyridine, any catalytic effect which the sulfo lower fatty acid might have is inhibited by the presence of the basic catalyst.

Sulfoacetic acid as employed for the treatment of cellulose in accordance with our invention can be prepared in a number of ways. For example, it may be conveniently prepared by reacting 11 moles of acetic anhydride diluted with an equal weight of acetic acid with 1 mole of sulfuric acid at room temperature for 24 hours followed by heating to 180° C. for such time that a sample of the mixture diluted with water shows the absence of sulfuric acid upon testing with barium hydroxide. When this point is reached, the excess of acetic anhydride is converted to acetic acid with a small amount of water. Instead of sulfoacetic acid, other sulfo fatty acids, such as sulfopropionic or sulfobutyric acid, may be employed. The treatment is carried out therewith at an elevated temperature of 170–210° F.

The concentration of the sulfoacetic acid is conveniently within the range of from about 0.1 to about 20%, based upon the weight of the cellulose, although almost any small proportion of sulfoacetic acid has a beneficial effect upon the cellulose. Preferably it is within the range of from about .5 to about 10 weight percent. If desired, a small amount of a surface active agent may be used with the sulfoacetic acid, as sometimes this seems to assist penetration into the cellulose.

The following examples illustrate the activation and viscosity reduction of cellulose in accordance with our invention.

EXAMPLE 1

Twenty gram portions of purified cotton linters containing 5% moisture are heated for 30 minutes at 190° F. in a mixture of 60 g. acetic acid, 1 g. sulfoacetic acid, with and without acetic anhydride (see Table 1 below) to effect viscosity reduction. The cellulose samples of reduced D.P. are then washed with acetic acid and reacted separately at 190° F. with 60 g. of phthalic anhydride in 80 g. of acetic acid containing 40 g. of potassium acetate. The products are isolated after dilution of the reaction mixtures with acetic acid by precipitation into acidified water. They are then water-washed and dried.

Table 1

Effect of acetic anhydride, in the presence of sulfoacetic acid, on Phthalation Reaction Time.

| Sample | Grams Ac₂O | Time necessary to achieve clear phthalation reaction solution (hours) | Apperance of product in acetone solution [1] |
|---|---|---|---|
| A | 0 | 12 | Hazy. |
| B | 2 | 11 | Do. |
| C | 5 | 3 | Clear. |
| D | 10 | 3 | Do. |

[1] After three hours total phthalation reaction time.

From the above data, it may be observed that greatly increased reactivity, as measured by the time required to achieve a clear reaction solution, is attained with a minimum of 5 g. of acetic anhydride present during the viscosity reduction step. The 5 g. represents the amount necessary to react with the 5% moisture present in the 20 g. sample of linters, rendering the viscosity reduction solution anhydrous. Smaller amounts of anhydride result in greatly increased phthalation times.

EXAMPLE 2

This example shows the operation of this invention using production-type rather than laboratory equipment. 400 g. of purified cotton linters containing 5% moisture are placed in a sigma-blade mixer along with 800 g. of acetic acid, 100 g. of acetic anhydride, and 20 g. of sulfoacetic acid. This mixture is macerated at room temperature for 30 minutes, after which the jacket temperature is raised to 150° F. and the mixture macerated for an additional 45 minutes. At the end of this time a fine, uniform slurry results, to which 1200 g. of phthalic anhydride and 800 g. of potassium acetate are added. The jacket temperature is raised to 200° F. and at the end of 4 hours a clear, grain-free solution is attained. The product is isolated by addition of water to the mixer until the ester precipitates in the form of coarse crumbs. These are further ground in a Fitzmill and washed until free of acid. After drying, the material is found to contain 53% combined phthalyl.

EXAMPLE 3

The same procedure is followed as in Example 2 except that the formula omits the 100 g. of acetic anhydride during the viscosity reduction step. After 7 hours reaction time, the reaction mass has still not achieved a clear and grain-free condition and samples isolated from the reaction mixture contain only 35% of combined phthalyl.

The results of the foregoing two examples again show the enhanced reactivity attained by the presence of sufficient acetic anhydride to render the mixture anhydrous during the viscosity reduction step of the procedure outlined herein.

EXAMPLE 4

4 lb. of purified cotton linters (5% moisture) are placed in a sigma-blade mixer along with 10 lb. acetic acid, 1 lb. acetic anhydride, and 91 g. of sulfoacetic acid. The jacket temperature is maintained for 30 minutes at 100° F. then raised to 200° F. for two more hours. Esterification of the reduced viscosity cellulose is accomplished by the addition of 12 lbs. of hexahydrophthalic anhydride (1,2-cyclohexane dicarboxylic anhydride) and 8 lbs. of potassium acetate. A clear and grain-free reaction solution is obtained in 6 hours. The product, isolated as described in Example 2, is found to contain 64% combined hexahydrophthalyl upon analysis.

The invention has been described in detail with particular reference to preferred embodiments thereof, but it will be understood that variations and modifications can be effected within the spirit and scope of the invention as described hereinabove and as defined in the appended claims.

We claim:
1. A process for activating cellulose to thereby produce an activated cellulose having an increased rate of reaction during subsequent reaction with a dicarboxylic acid anhydride, which process comprises forming an activation medium by contacting said cellulose with an anhydrous mixture of a lower fatty acid anhydride, a lower fatty acid, and a sulfo lower fatty acid at a temperature within the range of from about 50° C. to about 200° C. for a period of time sufficient to reduce the intrinsic viscosity of said cellulose to within the range of from about 0.5 to about 3; at most about 5 weight percent of said cellulose being dissolved in said mixture during said contacting.

2. A process as in claim 1, wherein said sulfo lower fatty acid is sulfo acetic acid.

3. A process as in claim 2, wherein the concentration of said sulfo acetic acid is from about 0.1% to about 20% based upon the amount of cellulose present in said activation medium.

4. A process as in claim 3, wherein said lower fatty acid anhydride is acetic anhydride, and said lower fatty acid is acetic acid.

5. A process as in claim 4, wherein the temperature range maintained is from about 80° C. to about 150° C.

6. A process as in claim 5, wherein the said period of time is about 30 minutes.

References Cited

UNITED STATES PATENTS

| | | | |
|---|---|---|---|
| 1,030,311 | 6/1912 | Koetschet et al. | 260—227 |
| 2,143,785 | 1/1939 | Malm | 260—229 |
| 2,498,010 | 2/1950 | Seymour et al. | 260—227 |
| 2,673,202 | 3/1954 | Crane | 260—227 |
| 2,814,617 | 11/1957 | Hagenbuch et al. | 260—227 |
| 2,854,445 | 9/1958 | Clevy et al. | 260—227 |
| 2,899,423 | 8/1959 | Malm et al. | 260—227 |

DONALD E. CZAJA, Primary Examiner

R. W. GRIFFIN, Assistant Examiner

U.S. Cl. X.R.

106—181, 183, 196; 260—101, 224, 227